United States Patent [19]
Zagranski et al.

[11] Patent Number: 4,969,444
[45] Date of Patent: Nov. 13, 1990

[54] TRANSFER SYSTEM FOR COMBUSTION ENGINE FUEL CONTROL DEVICES

[75] Inventors: Raymond D. Zagranski, Somers; Albert H. White, Wethersfield, both of Conn.

[73] Assignee: Colt Industries Inc., New York, N.Y.

[21] Appl. No.: 355,953

[22] Filed: May 22, 1989

[51] Int. Cl.⁵ .................... F02C 9/26; F02M 39/00
[52] U.S. Cl. .................... 123/510; 123/198 D; 60/734; 60/39.094
[58] Field of Search ............ 123/510, 198 D, 359, 123/479, 198 DB; 60/223, 39.091, 39.094, 734

[56] References Cited
U.S. PATENT DOCUMENTS 2,968,347 1/1961 Farkas ........................ 60/39.091
3,033,277 5/1962 Cowles ....................... 60/39.094
3,488,946 1/1970 Jubb .......................... 60/39.091
4,291,532 9/1981 Robinson ..................... 60/223
4,334,406 6/1982 Todd ......................... 60/223
4,656,827 4/1987 Puillet ....................... 60/734
4,683,854 8/1987 Goulet ....................... 123/479

Primary Examiner—Carl Stuart Miller
Attorney, Agent, or Firm—Howard S. Reiter

[57] ABSTRACT

This invention relates generally to fuel control systems for combustion engines such as gas turbines used in helicopters and the like, and more specifically relates to a fuel control transfer system which permits the substitution of one fuel control device for another which is supplying fuel to an operating combustion engine, without interruption of, or adverse effect on continued operation of the engine.

8 Claims, 1 Drawing Sheet

TRANSFER SYSTEM FOR COMBUSTION ENGINE FUEL CONTROL DEVICES

BACKGROUND

Prior art fuel control systems for gas turbine engines have incorporated a single control device. Such devices enable an operator to manually position the main fuel metering valve and/or other control elements in the event of a failure in the automatic positioning system. Examples of automatic fuel controls having automatic positioning systems, as well as manual controls therefore, are illustrated in U.S. Pat. Nos. 3,820,323; 4,077,203; and 4,302,931. Although such manual "back-up" controls have worked satisfactorily, the possibility remains that the entire fuel control device may become inoperable during flight (e.g. failure of both the automatic positioning control as well as the manual positioning control), resulting in engine shut down due to interruption of the fuel supply.

Although it may be recognized as desirable to provide redundant separate fuel control devices, in parallel, each capable of independently supplying the fuel required by an engine, this approach involves serious risks during the transition period. Transient disruptions in the fuel flow rate during the transition from one parallel device to another can cause engine flame out and/or overfueling which in turn can result in overtemperature or overspeed conditions and serious engine damage.

SUMMARY OF THE INVENTION

Accordingly, it is an object of this invention to provide a fuel control transfer system having two fuel control devices, which is capable of selectively supplying fuel to a combustion engine through either one of the two control devices without significant disruption of fuel flow parameters during the transition.

Another object is to provide such a system with an emergency shutoff means utilizing a single valve device capable of interrupting the supply of fuel to the combustion engine regardless of which fuel control device is in operation at the time of interruption.

Still another object of this invention is to provide a fuel control transfer system of the type described, in which unintended over-pressure in the fuel supply to a combustion engine is avoided automatically, in the event that all fuel control devices become inoperative concurrently.

These and other and further objects, features, and advantages of this invention will be made apparent by the following description and accompanying drawings illustrating an embodiment of this invention.

DETAILED DESCRIPTION

Figure 1:
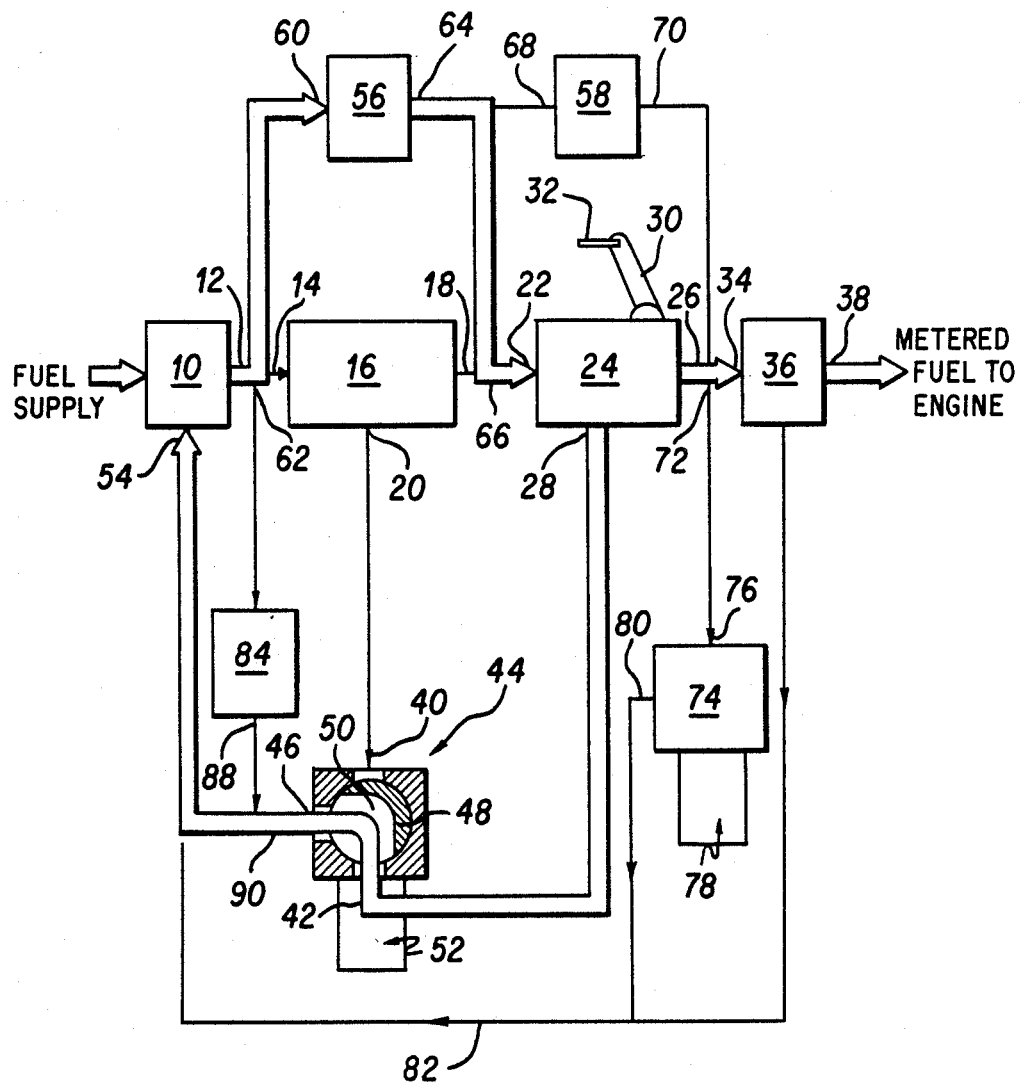
FIG. 1 is a schematic diagram of a fuel control transfer system in accordance with this invention, incorporating individual elements of known design, and showing by darker lines a particular fuel flow path which is characteristic of one mode of operation of such a system.

Referring to FIG. 1, the fuel control transfer system of this invention may be seen to be connected to receive fuel from a fuel supply source which is aided by a fuel pump 10, (not shown), and to deliver metered fuel to an engine (not shown). The fuel pump 10 may be of any suitable design, many of which are well known and readily available.

The output from the fuel supply, in this case the outlet 12 of pump 10, is connected to the fuel inlet 14 of a fuel control device 16. The fuel control device may be of any well known design such as is described in the U.S. Patents hereinbefore mentioned, and further described in U.S. Pat. No. 4,793,133 which is concurrently owned by the assignee of this Patent Application. In addition to the fuel inlet 14, fuel control device 16 includes a fuel outlet 18 and an overflow outlet 20. The fuel outlet 18 of the first fuel control device 16 is coupled to the fuel inlet 22 of a second fuel control device 24. This second fuel control device is also provided with a fuel outlet 26 and an overflow outlet 28, in the manner of fuel control device 16.

Fuel control device 24 is shown to include a manual control lever 30 which is connected by means of a control cable 32 (shown partially) to suitable manual control levers (not shown). A fuel control device having such a manual control lever is fully described in previously mentioned U.S. Pat. No. 4,793,133. It is noted for the purposes of this embodiment, that the first and second fuel control devices 16 and 24 may be identical or they may be dissimilar; and one may incorporate a manual control such as lever 30, while the other may not. The control transfer system of this invention will work equally well if both control devices have a manual control provision, or if neither one has such a provision, in addition to functioning in a desirable manner if one but not the other includes a manual control.

The outlet 26 of fuel control 24 is coupled to the inlet 34 of a pressure regulating valve 36, of known design. The outlet 38 of regulating valve 36 is coupled to the input of the combustion engine (not shown) to deliver fuel for operating the engine.

It can be seen from the foregoing description that the two fuel control devices 16 and 24, together define a serially connected fuel line which represents a flow path for fuel between the fuel supply source (not shown) and the engine (not shown), via fuel pump 10 and pressure regulating valve 36. In this manner, the fuel control devices are considered to be connected in, as well as part of the fuel line.

With further reference to FIG. 1, the overflow outlets 20, 28 of fuel control devices 16, 24 are seen to be connected to the overflow inlets 40, 42 of a selectively operable three-way transfer control valve 44, of known design. The inner rotor member 48 of control valve 44 includes a right angle flow passage 50 which establishes an internal flow path from overflow inlet 42 to transfer outlet 46 in one position (as shown), and in another position establishes such a fluid flow path from overflow inlet 40 through transfer outlet 46. The position of the rotor 48 may be changed selectively through the driving force of an electric motor 52 which is coupled to the rotor in a known manner and maybe controlled by any suitable electrical control apparatus (not shown). The transfer control outlet 46 of control valve 44 is shown coupled to the inlet 54 of fuel pump 10. This is illustrated as one embodiment only, and it should be recognized that the return flow of fuel through transfer outlet 46 may be directed to the fuel supply source, remote from the inlet 54 of fuel pump 10, if desired.

Referring again to fuel control devices 16, 24, they are seen to have associated with them a pair of normally closed pressure relief valves 56, 58, of the type in which a biasing spring maintains the valve in closed position, until a predetermined fluid pressure exists at the inlet to the valve, and thereafter the valve opens to permit flow therethrough. In this embodiment, the pressure inlet 60 of pressure relief valve 56 is coupled into the fuel line at point 62 between the outlet of pump 10 and fuel inlet 14 of fuel control device 16. The pressure outlet 64 of relief valve 56 is coupled to the fuel line at point 66 between the fuel outlet 18 of fuel device 16 and the fuel inlet 22 of fuel control device 24. The pressure inlet 68 of pressure relief valve 58 is also coupled to the fuel line at point 66 between the fuel outlet 18 of control device 16 and the fuel inlet 22 of control device 24. As a result of these connections, it appears that the pressure inlet 68 of relief valve 58 is connected to the pressure outlet 64 of relief valve 56; while this is true, it is incidental to the operation of this embodiment of the invention. The output of relief valve 56 need not be delivered to the input of relief valve 58. Further, it can be seen that the pressure outlet 70 of relief valve 58 is coupled to deliver fuel to the fuel line at point 72 between the fuel outlet 26 of fuel control device 24 and the inlet 34 of pressure regulating valve 36.

An emergency shut down valve 74, is shown having an inlet 76 coupled to the fuel line at point 72 between the fuel outlet 26 of fuel control 24 and the combustion engine. This valve, which is normally closed, may be of well known design, and may be operated in known manner as by a solenoid 78, or other suitable means. The valve includes an emergency outlet 80 which is coupled to return fuel to the inlet 54 of fuel pump 10 through a return line 82. As noted previously, return of fuel to the inlet 54 of pump 10 is not essential to this invention, and returned fuel might be delivered to the fuel supply source, if desired. The purpose of valve 74, is to provide for emergency shutdown of the engine by providing an immediately available diversion path for the fuel in the fuel line prior to the engine, at point 72 for example, to be diverted away from the engine and back to the fuel source or to the fuel pump, without entering the engine.

An emergency pressure relief valve 84 represents an added safety feature for this embodiment of the invention. This valve maybe a normally closed, spring loaded relief valve of known design, similar to relief valves 56, 58. The overpressure relief valve 84 includes an overpressure inlet 86 which is connected to the fuel line at point 62 between the outlet 12 of pump 10 and the inlet 14 of control device 16. As previously suggested, it is not essential for the overpressure inlet 86 and the relief inlet 60 to be connected to the fuel line at the same point 62. They have been shown connected at the same point in the schematic diagram of FIG. 1 for convenience only. It should be recognized that the inlets 60 and 86 may be connected to the fuel line at separate points which are, in the manner of point 62, located between the fuel supply and the inlet 14 of the first fuel control device 16. The purpose of overpressure relief valve 84 is to avoid the possibility of damage to the engine by pressurized fuel flowing directly to the engine from the pump 10 in the event that both fuel control devices 16, 24 become inoperative, and to prevent damage to the system which might be caused by deadheading or over-restricting of fuel flow. Overpressure relief valve 84 permits fuel to flow from the pump outlet 12 directly to the pump inlet 54 via overpressure outlet 88 which is connected to pump inlet 54 via a return line 90 which also serves to deliver returned fuel from the transfer outlet 46 of transfer valve 44 to the pump inlet 54.

Fuel control devices 16, 24, have been described to include respectively, fuel inlets 14, 22, fuel outlets 18, 26, and overflow outlets 20, 28. As is more fully described in the aforementioned U.S. patents, the fuel control devices operate to control the quantity/rate of fuel being delivered to the engine, in response to control signals and stimuli derived from external controls and sensors (not shown) in a known manner. The control devices in the illustrated embodiment are of the type which receive (from the supply) more fuel than is required for operation of the engine, and which divert the unneeded fuel and return it to a fuel pump (or supply source) through the overflow outlets 20, 28. A further feature of the control devices 16, 24, is that when the flow of fuel through the overflow outlets 20, 28 is obstructed, the flow of fuel through the control device for example: from inlet 14 to outlet 18, or from inlet 22 to outlet 26 is automatically, reduced substantially, and the pressure drop across the device accordingly is substantially increased. This is an inherent design feature of the control device.

The operation of the fuel control transfer system which has been described thus far, is as follows: the fuel control devices 16, 24, are in effect, connected in series; however, it is only necessary for one of the control devices to operate at any given time for complete control of the engine. This serial connection in the fuel line between the fuel source and the engine assures that transition of control from one control device to the other will not cause any significant disruption in the flow of fuel to the engine. In the embodiment of FIG. 1, transfer control valve 44 is shown in a position which obstructs the overflow outlet 20 of control device 16. As a result, the flow of fuel between fuel inlet 14 and fuel outlet 18 of control device 16 is substantially reduced. This raises the pressure in the fuel line at point 62 until the pressure exceeds the "opening value" of pressure relief valve 56. When pressure relief valve 56 opens in this manner, dual control 16 is, in effect, bypassed and fuel flows directly from the fuel supply source through valve 56 and into the fuel inlet 22 of fuel control device 24. Because the fuel overflow outlet 28 of control device 24 is open to return line 90 through transfer valve 44, the flow of fuel continues through control device 24, through pressure regulating valve 36 and on to the engine. The fuel flow path from the fuel supply to the engine is represented in FIG. 1 by the heavy dark lines extending from outlet 12 of pump 10 to inlet 60 of pressure relief valve 56, then from outlet 64 of valve 56 to inlet 22 of control device 24, and from outlet 26 of control device 24 and then through pressure regulating valve 36 from inlet 34 to outlet 38 and on to the engine. Fuel received into fuel control device 24 which is in excess of engine operating requirements at any time, is allowed to overflow through outlet 28 of control device 24 and to return to inlet 54 of pump 10 through transfer control device 44; this returned fuel flow path is represented in FIG. 1 by the heavy dark line extending from outlet 28 of control device 24 to inlet 42 of transfer control valve 44, and then from outlet 46 of control valve 44 to inlet 54 of pump 10.

As the rotor 48 of control valve 44 is rotated clockwise as shown in FIG. 1, the inner path 50 through the rotor 48 will progressively constrict inlet 42 while progressively opening inlet 40 to establish a path between inlet 40 and outlet 46. The configuration of the rotor may be modified and adapted in a well known manner so that as it rotates, the flow path between inlet 42 and outlet 46 is progressively reduced until it is shut off completely, while a flow path between inlet 40 and outlet 46 is progressively increased at a desired rate from shut off to maximum opening. In this manner, when the overflow outlet 28 of fuel control device 24 is completely cut off and overflow outlet 20 of control device 16 is fully coupled to inlet 54 of pump 10 through line 90, fuel to the engine will flow in a normal manner through control device 16, and then will bypass control device 24 via pressure relief valve 58.

The transfer from one control device to the other control device, thus can be accomplished in a smooth and continuous manner with minimum transient disruptions or discontinuities in the characteristics of the fuel flow to the engine. It may be recognized that at some point in the rotation of the rotor in transfer valve 44, both fuel control devices 16, 24 may be in operation; however it is recognized that simultaneous operation of both control devices 16, 24 in series will not have any effect on operation of the engine because maximum flow in the fuel line overall will not exceed the lessor of the maximum allowed by either control. On the other hand, the minimum of fuel flow in the line will not be less than the minimum amount allowed by either control.

While this invention has been particularly shown and described with respect to a particular embodiment, it will be understood by those skilled in the art that changes in form and details may be made therein without departing from the scope and spirit of this invention. Accordingly, it is intended, and should be clearly understood, that the invention is intended to be limited only as it is set forth in the following claims.

We claim:

1. A fuel control transfer system for use with a combustion engine arrangement having a combustion engine, a fuel source for said engine, a fuel line extending between said fuel source and said engine, and a fuel pump connected in said fuel line between said fuel source and said engine and operable for supplying fuel from said source to said engine through said fuel line, the transfer system comprising:
    a first fuel control device connectable in said fuel line between said fuel source and said combustion engine, and being selectively operable in a control mode in which fuel passes therethrough between said pump and said engine, and in a backup mode in which the flow of fuel therethrough is obstructed;
    a first bypass fuel flow means for permitting the flow of fuel through said fuel line past first fuel control device when said first fuel control device is operating in said backup mode;
    a second fuel control device connectable in said fuel line between said first fuel control device and said engine, and being selectively operable in a control mode in which fuel passes therethrough between said source and said engine, and in a backup mode in which the flow of fuel therethrough is obstructed;
    a second bypass fuel flow means for permitting the flow of fuel through said fuel line past said second fuel control device when said second fuel control device is operating in said backup mode; and transfer control means selectively operable to cause one of said first and second control devices to operate in said backup mode, such that fuel flowing in said fuel line will flow through one of said first and second fuel control devices and the respective other one of said first and second bypass means when passing from said fuel pump to said combustion engine.

2. A fuel control transfer system in accordance with claim 1, wherein:
    said first and second fuel control devices each have a fuel inlet, a fuel outlet, and an overflow outlet; the fuel inlet of said first fuel control device being connectable to said fuel source as part of said fuel line, the fuel outlet of said first fuel control device being connected to the fuel inlet of said second fuel control device as part of said fuel line, and the fuel outlet of said second fuel control device being connectable to said engine as part of said fuel line; said system further comprising overflow means coupled to receive fuel from the overflow outlets of each of said first and second fuel control devices and for returning fuel to the inlet of said first fuel control device.

3. A fuel control transfer system in accordance with claim 2, wherein:
    the said first and second fuel control devices are of the kind in which the mode of operation thereof is changed from control mode to the backup mode in response to obstruction of the flow of fuel from the said overflow fuel outlet; thereof and, said overflow means further comprises a selectively operable fuel transfer valve operable to permit flow of fuel from the overflow outlet of one of said first and second fuel control devices to the inlet of said first fuel control device while obstructing the flow of fuel from the overflow outlet of the other of said first and second fuel control devices.

4. A fuel control transfer system in accordance with claim 3, wherein:
    said fuel transfer valve has first and second overflow inlets through which fuel is received from the overflow outlets of said first and second fuel control devices, and a transfer outlet which is progressively opened to one of said first and second inlets while it is progressively closed to the other of said first and second inlets as said transfer valve is operated.

5. A fuel control transfer system in accordance with claim 4, wherein:
    said transfer valve means is operated by an electric motor.

6. A fuel control transfer sYstem in accordance with claim 1 or claim 3, wherein:
    at least one of said first and second bypass fuel flow means is a pressure operated relief valve operable to permit fuel flow therethrough in response to increased fuel pressure in said fuel line at the corresponding one of said first and second fuel control devices caused by selection of the backup mode of operation for said corresponding fuel control device;
    said pressure operated relief valve further being operable to prevent fuel flow therethrough in response to decrease in fuel pressure at said corresponding fuel control device as a result of return of said corresponding fuel control device to its control mode of operation.

7. A fuel control system in accordance with claim 1, wherein said fuel pump is located in said fuel line between said fuel source and said first fuel control device, said system further comprising:

a normally-closed pressure-operated safety valve having a safety inlet coupled to said fuel line between said pump and said first fuel control device, and a safety outlet connectable to one of said pump and said fuel source for diverting fuel from said fuel line through said safety outlet in response to the existence of fuel pressure in said fuel line between said pump and said first fuel control device which is in excess of a predetermined value.

8. A fuel control transfer system in accordance with claim 1, further comprising:

a normally-closed emergency shut-down valve having an emergency inlet connected to said fuel line between said second fuel control device and said combustion engine, and having an emergency outlet connectable to return fuel to one of said fuel pump and said fuel source;

said shut off emergency valve being selectively operable from its normally closed condition to an open condition wherein fuel flowing in said fuel line between said second fuel control device and said combustion engine is diverted from said engine and is returned to one of said fuel pump and said fuel source through said emergency outlet of said emergency valve.

* * * * *